United States Patent [19]

Macduff

[11] Patent Number: 5,542,603
[45] Date of Patent: Aug. 6, 1996

[54] HYDRONIC HEATING SYSTEM

[76] Inventor: Jim Macduff, 1284 Montrose Avenue, Victoria, British Columbia, Canada, V8T 2K6

[21] Appl. No.: 314,902

[22] Filed: Sep. 29, 1994

[51] Int. Cl.$^6$ ................................................ F24D 3/16
[52] U.S. Cl. .................................. 237/69; 165/53
[58] Field of Search .................. 165/53, 171, 181, 165/183; 237/69

[56] References Cited

U.S. PATENT DOCUMENTS

| | | | |
|---|---|---|---|
| 2,226,061 | 12/1940 | Kershaw | 237/69 X |
| 2,919,117 | 12/1959 | Hoffman | 237/69 X |
| 4,313,430 | 2/1982 | Britner et al. | 165/183 X |
| 4,348,793 | 9/1982 | Bloem | 165/183 X |
| 4,428,420 | 1/1984 | Blakely | 165/183 |
| 4,508,162 | 4/1985 | Radtke | 237/69 X |
| 5,131,458 | 7/1992 | Bourne et al. | 237/69 X |

FOREIGN PATENT DOCUMENTS

| | | |
|---|---|---|
| 2075478 | 2/1991 | Canada. |
| 2063841 | 3/1992 | Canada. |
| 2078185 | 9/1992 | Canada. |

*Primary Examiner*—William E. Tapolcai
*Attorney, Agent, or Firm*—Andrus, Sceales, Starke & Sawall

[57] ABSTRACT

A hydronic heating system for radiantly heating habitable space is disclosed. The radiant heating system uses heated fluid circulated through under-floor or in-wall endless pipe loops and heat radiation fins which clip onto the pipe loops. The system permits heated fluid to be circulated at boiler temperatures, obviating a requirement for mixing valves, heat exchangers or buffer tanks, because the endless pipe loop is spaced away from the wall or floor and all heat is exchanged through convection by air surrounding the heat radiation fins. The advantages include a more affordable heating system due to less pipe, fewer components and faster installation. As well, the system provides a more even heat distribution and the eliminates hot spots. Furthermore, the endless pipe loops are spaced from the floor or wall surface, and thereby protected from danger of puncture by a nail or screw driven through the surface.

13 Claims, 4 Drawing Sheets

5,542,603

HYDRONIC HEATING SYSTEM

TECHNICAL FIELD

The present invention relates to heating systems for habitable space, and in particular to radiant heating systems for under-floor or in-wall applications.

BACKGROUND OF THE INVENTION

Radiant heating systems for living and/or working spaces are widely known. One popular type of radiant heating system for these applications is the hydronic heating system wherein a heated fluid such as water is pumped through an endless pipe loop installed under a floor (RFH) or inside a wall (RWH). Heat is supplied to the living or workspace by radiation from fluid circulated through the endless loop which heats the floor or wall. The fluid is typically heated by a boiler which burns a carbonaceous fuel such as natural gas or fuel oil.

Traditionally, hydronic heating coils have been installed between floor joists or wall studs with at least one loop between each pair of adjacent joists or studs. Furthermore, the endless loop has traditionally been supported in close contact with the floor or wall surface and heat conductive plates have been used to enhance the radiation of heat from the endless loop to the undersurface of the floor. Typical of the prior art installations are Canadian Patent Application 2,078,135 entitled RADIANT FLOOR AND WALL HYDRONIC HEATING SYSTEMS to Fiedrich which was laid open to public inspection on Dec. 31, 1993; and Canadian Patent Application 2,063,841 entitled MODULAR BACK SIDE RADIANT HEATING PANELS to Bourne and Springer which was laid open to public inspection on Sep. 26, 1992.

In Canadian Patent Application 2,078,135, a heating system using plastic tubing for RFH and RWH heating applications is described. The system uses a thermally conductive plate that is mounted under the floor or behind the wall directly adjacent and undersurface of the floor or wall. In one embodiment, a radiation plate made of aluminum or the like has a longitudinal groove 34 that fits snugly around the plastic tubing. The tubing is installed under the floor by cradling it in the groove of the conductive plate, and the plate is screwed to the sub floor using strapping to hold the plate and the tubing in close contact with the sub floor surface. The entire installation is accomplished with a single endless loop of tubing.

Canadian Patent Application 2,063,841 describes modular heating panels constructed with plastic pipes supported on an insulated backing intended to be clamped between floor joists and/or wall studs for RWH and RFH hydronic heating systems. Each panel is constructed of an insulating board and aluminum heat fins. The heat fins completely surround the pipe and provide a heat radiating surface with a large surface area which is preferably held in close contact with the subfloor or rear wall surface. The plastic heating pipes are pre-installed in each panel and must be connected together to assemble an endless heating loop.

Such prior art radonic heating systems suffer from a number of disadvantages. First, the radiant plates which support the heating tubes are preferably secured directly to the floor or wall surface. This promotes "hot spots" on the floor or wall. Heating fluid temperatures must therefore be controlled in order to prevent hot spots which could prove injurious or discomforting to occupants of the heated space. Second, plastic piping used in hydronic heating system is vulnerable to puncture by fasteners driven through the flooring or the wall structure by persons who are not aware of the hazard. Such accidental damage to the heating system can cause water damage and potentially cause damage to the fluid distribution pump and/or the boiler used for heating the fluid. Third, at least one loop is required in each inter joist space in order to lay out the endless heating loop efficiently as well as to provide adequate radiant heat in most climates. Fourth, as noted above most boilers operate at temperatures which exceed the desired temperature of a floor surface. It is therefore necessary to provide some mechanical arrangement to prevent fluid heated by the boiler from circulating in an undiluted condition through the hydronic heating system. Expensive flow control components which must be installed by skilled workmen are therefore required in the heating system. This contributes to the cost of installation and maintenance of the system.

FIGS. 1a–1e illustrate several commonly used prior art mechanical arrangements for controlling the temperature of fluid circulated through hydronic floor heating systems. In FIG. 1a, a boiler bypass valve 20, typically a balancing valve, is placed between a supply and a return side of a boiler 28. A second valve may be required on the return side of the boiler 28 to help restrict flow through the boiler 28. When the system calls for heat, the pump pulls a portion of the water through the boiler 28 and a portion from the water returning from the floor. The returning water mixes with the boiler water and lowers the temperature of the boiler water. The resulting water temperature depends upon the mix ratio. Cooler water may be procured by opening the bypass valve to permit more water from the floor to recirculate. This system is primarily useful when a fixed temperature is desired and there is no variation in the flow rate of heating fluid in the distribution pipe.

FIG. 1b shows an alternate arrangement wherein a three-way mixing valve 30 is used to do essentially the same job as the boiler bypass valve 20 described above. The three-way mixing valve 30 is mounted inline on the supply side of the boiler with a connecting line to the return side of the boiler 28. By manually adjusting the valve, a mixture of boiler water and return water can be balanced to the desired floor delivery temperature. In an alternate three-way mixing valve arrangement, a tempering valve may be used. The tempering valve is plumbed in the same manner as the three-way manual valve that is designed to produce a constant temperature. The tempering valve has an internal thermal element which throttles the amount of return water that is allowed to mix with the boiler water. The thermal element is manually adjusted to a desired temperature and will maintain a water mixture suitable to attain the desired temperature at all times when the system is operational.

FIG. 1d shows yet another common arrangement using a four-way mixing valve 34. It is desirable to maintain a constant flow in the boiler in order to increase boiler life and efficiency. The four-way mixing valve 34 makes this possible. It is positioned between a primary circulation loop between the boiler and a primary circulation pump 36 and a secondary installation loop between a heating loop 26 and a circulation pump 24. The boiler water and water returning from the floor are proportionally mixed to the desired floor delivery temperature and circulated back to the floor. Some of the returning floor water is also mixed with the recirculating boiler water and returned to the boiler 28. Flow in both of the loops is kept constant. The high water temperature return to the boiler reduces the probability of stressing the boiler with cold shock and condensation.

FIG. 1d shows another arrangement wherein a buffer tank 38 is used to reduce the boiler water temperature before it is circulated through the heating loop 26. A first pump 36 circulates water between the boiler 28 and the buffer tank 38. The buffer tank typically holds 20 to 50 gallons of water. The boiler is controlled by a water temperature thermostat (not shown) placed in the top of the buffer tank which senses the water temperature in the tank. A second pump 24 circulates water from the tank through the heating loop 26. The second pump draws water from the top of the buffer tank as called for by a room temperature thermostat (not shown) and returns water to the bottom of the buffer tank.

FIG. 1e shows yet another arrangement wherein a heat exchanger permits a boiler water loop to be completely isolated from the heating loop 26. Heat exchanger constructions are well known. They may be a tube type or a shell and plate type construction. In either case, water heated by the boiler is circulated in close contact with water circulated to the heat loop 26. Heat exchangers must be properly sized and the flow, exchange rate and BTU output of the boiler are critical in designing a system that will perform properly. Heat exchangers are generally compact but relatively expensive and are best configured by technicians that specialize in heat exchangers for hydronic heating systems.

SUMMARY OF THE INVENTION

It is a primary object of the invention to provide a simple hydronic heating system which overcomes most known problems of the prior art.

It is a further object of the invention to provide a simple hydronic heating system which is less expensive to install and more readily controlled than the prior art hydronic heating systems.

It is yet a further object of the invention to provide a heat radiation fin for a hydronic heating system which may be connected to an installed heating loop.

It is yet a further object of the invention to provide a hydronic RFH heating system which is installed well below the subfloor to eliminate hot spots and to protect the heating tubing from accidental puncture by those that unsuspectingly drive fasteners through the floor.

It is yet a further object of the invention to provide a hydronic heating system which essentially obviates floor or wall damage due to the overheating of floor or wall materials.

These and other objects are achieved with a hydronic underfloor heating system for connection with a boiler that supplies heated fluid for distribution through the system, comprising at least one endless loop of conduit for circulating the heated fluid under the floor, the conduit being suspended beneath the floor to be heated so that the conduit does not directly contact any part of an underside of the floor, and a plurality of heat radiating fins affixable to the conduit for promoting a transfer of heat from the fluid in the conduit to air surrounding the conduit, the heat radiating fins having a conduit gripping part and a heat radiating part, the conduit gripping part being adapted to selectively engage the conduit in a close contact that promotes a transfer of heat from the conduit to the fin, and the heat radiating part being adapted to promote a transfer of heat from the fin to air surrounding the fin, whereby fluid heated by the boiler can be circulated directly through the conduit without special treatment to reduce the temperature of the fluid before circulation and the floor is evenly heated without hot spots by heat convected by the air surrounding the conduit.

The invention therefore provides a simplified hydronic heating system wherein an endless heating loop is installed under a floor or behind a wall to be heated in a direction that is transverse to the longitudinal dimension of the floor joists/wall studs. Furthermore, clip-on radiating fins which are preferably two-part fins that encircle a length of the tubing of the heating loop, radiate heat to the air beneath the subfloor or behind the wall. The air convects heat to the subfloor or wall surface. The convected heat is evenly distributed across the subfloor or wall surface. This eliminates hot spots on the floor or wall. It also obviates any necessity for reducing the water temperature before circulating water from a boiler through the endless heating loop. Thus, water at boiler temperature can be circulated directly through the heating loop and expensive sensors and flow control equipment are eliminated. Experimentation has also proved that the heating system in accordance with the invention requires up to 60% less heat distribution tubing than prior art systems required. Thus, a heating system can be installed in a floor or wall for a fraction of the cost of prior art hydronic heating systems.

BRIEF DESCRIPTION OF THE DRAWINGS

The invention will now be described by way of example only, and with reference to the following drawings, wherein.

DETAILED DESCRIPTION OF THE INVENTION

Figure 1A:
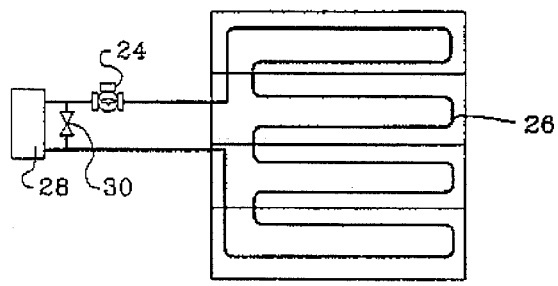
FIGS. 1a–1e show typical arrangements for moderating and controlling the temperature of water circulated through prior art hydronic heating systems.
Figure 1D:
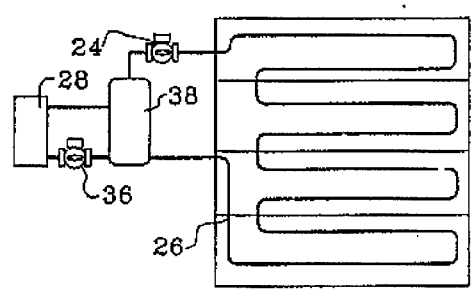
Figure 1B:
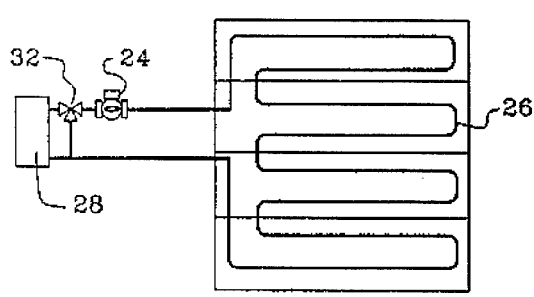
Figure 1E:
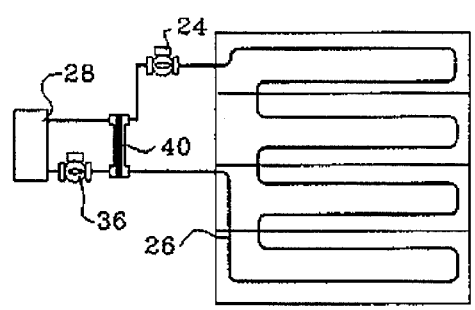
Figure 1C:
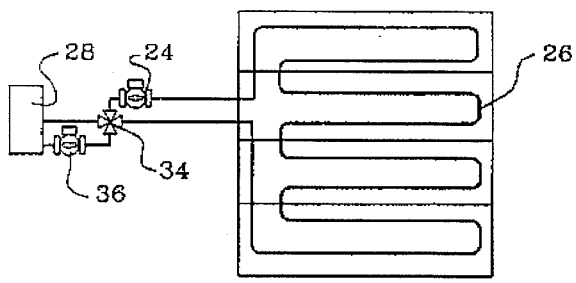
Figure 2:
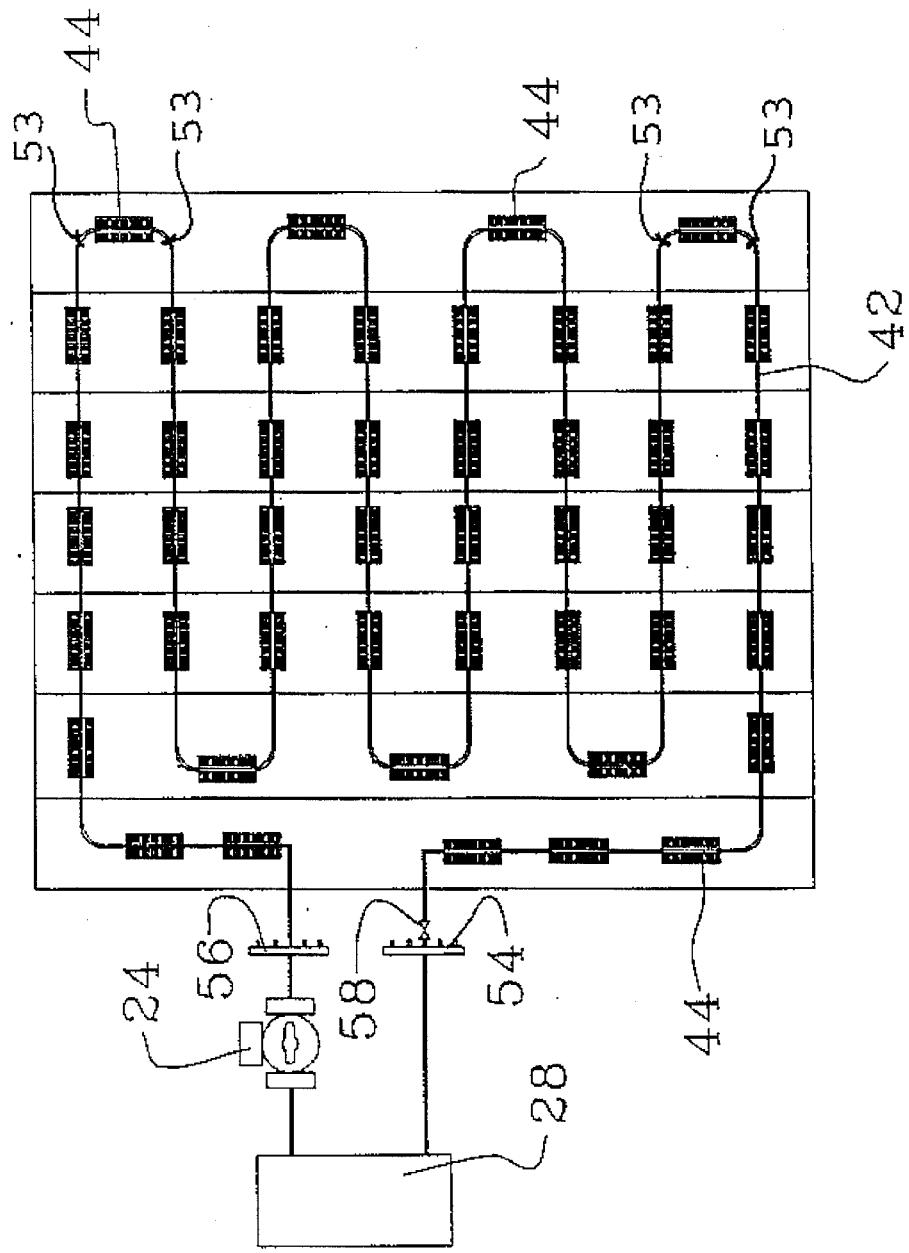
FIG. 2 is a schematic illustration of a hydronic heating system in accordance with the invention.

As shown in FIG. 2 of the drawings, a hydronic heating system in accordance with the invention includes an endless loop of tubing arranged in a heating loop 42. The tubing 42 is preferably a plastic pipe suitable for hydronic heating systems. In particular, it is preferably a hybrid pipe which includes plastic and aluminum components to prevent the intrusion of atmospheric oxygen into the heating fluid, which can corrode boiler parts and even attack the plastic tubing at elevated temperatures. Such hybrid tubing is well known and commercially available from a number of suppliers.

Prior art hydronic heating systems are installed with the heating loops placed in parallel with the floor joists/wall studs of the building structure. At least one heating loop is installed in each inter-joist/inter-stud space (see FIGS. 1a–1e). With a hydronic heating system in accordance with the invention, the heating loop 42 is installed transversely to the longitudinal dimension of the floor joists/wall studs. The tubing is pulled through holes drilled in the joist/stud to loosely accommodate the tubing in a location spaced well beneath the subfloor surface (see FIG. 4). This obviates the possibility of damage to the tubing of the heating loop by unaware individuals driving fasteners into the floor/wall surface for any number of reasons. It also obviates the traditional "hot spots" found on prior art hydronically heated floors where heat radiation plates may contact with the underfloor surface. A boiler 28 heats water for circulation through the heating loop 42 in a manner well known in the art. A fluid pump 24 circulates fluid heated by the boiler through the heating loop 42. Since the heating loop 42 is spaced below the subfloor and does not directly contact the sub floor, boiler temperature water can be circulated through the heating loop without fear of overheating the floor which could damage the floor or possibly injure occupants of the living or workspace above the floor. In order to promote a transfer of heat from the heating loop 42 to the floor, a plurality of heating fins, generally indicated by reference 44, are installed on the tubing of the heating loop 42. Preferably, a heating fin 44 is installed on the tubing between each joist. A heating fin 44 may also be installed on the endloops 42 which are suspended from the subfloor by a hook 54, or the like, to prevent sagging of the tubing in the heating loop 42. The heat radiating fins 44 are designed to clip on to the tubing in the heating loop 42 after it is installed in the subfloor. The heat radiating fins 44 transfer heat from the tubing to the air trapped beneath the subfloor. The heated air convects heat from the radiating fins 44 to the subfloor which radiates heat into the living or workspace above the floor.

Figure 3:
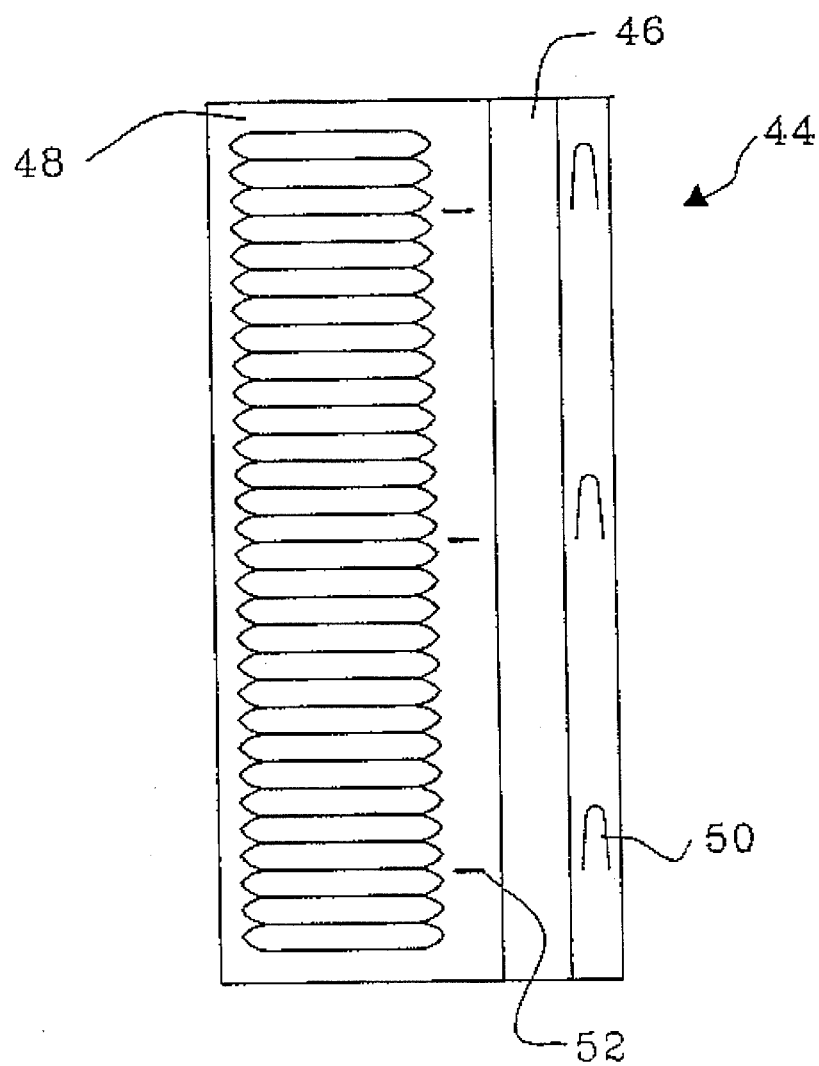
FIG. 3 is a top plan view of a heating fin for use with a hydronic heating system in accordance with the invention.

FIG. 3 shows a top plan view of a preferred embodiment of a heating fin in accordance with the invention. The heating fin 44 is constructed in two identical parts which are clipped together over the tubing of the heating loop 42 (see FIGS. 2 and 5). Each heating fin includes a conduit gripping part 46 and a heat radiating part 48. The conduit gripping part is a groove 49 (see FIG. 4) formed to the contour of one half of a longitudinal section of the tubing in the heating loop 42. The heat radiating part 48 is preferably louvered (see FIG. 4) to facilitate a circulation of air through the heat radiating fin 44. Experimentation has shown that the heat radiating part 48 promotes a circulation of air in the subfloor space which in turn promotes an even and rapid convection of heat from the heat radiating fin 44 to the subfloor surface. Each heat radiating fin 44 is further provided with tabs 50 which are preferably punched from the material of the fin 44. Each tab 50 engages a complementary slot 52 cut on an opposite side of the groove 49. When two heating fin components are assembled over the tubing of the heating loop 42, the tabs 50 are pushed through the slots 52 and bent over to hold the two components in tight contact with the tubing of the heating loop.

Figure 4:
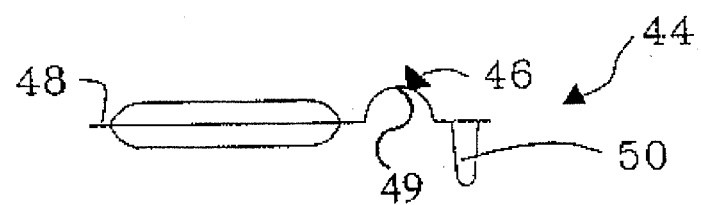
FIG. 4 is an end elevational view of the heating fin shown in FIG. 3.
Figure 5:
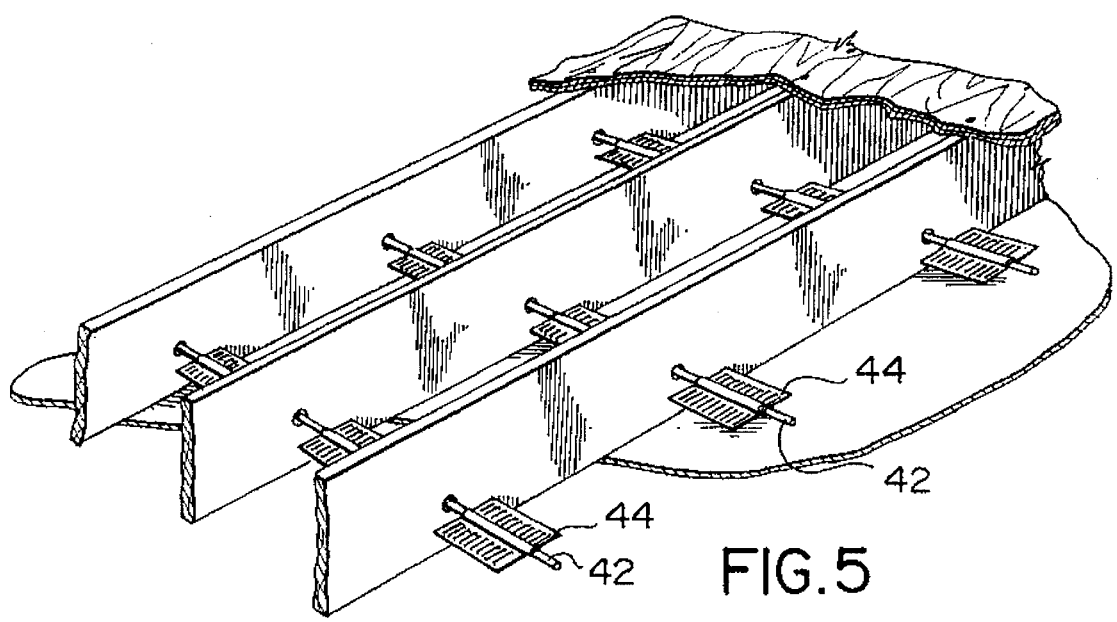
FIG. 5 is a perspective view of a section of floor in which a hydronic heating system in accordance with the invention is installed.
Figure 6:
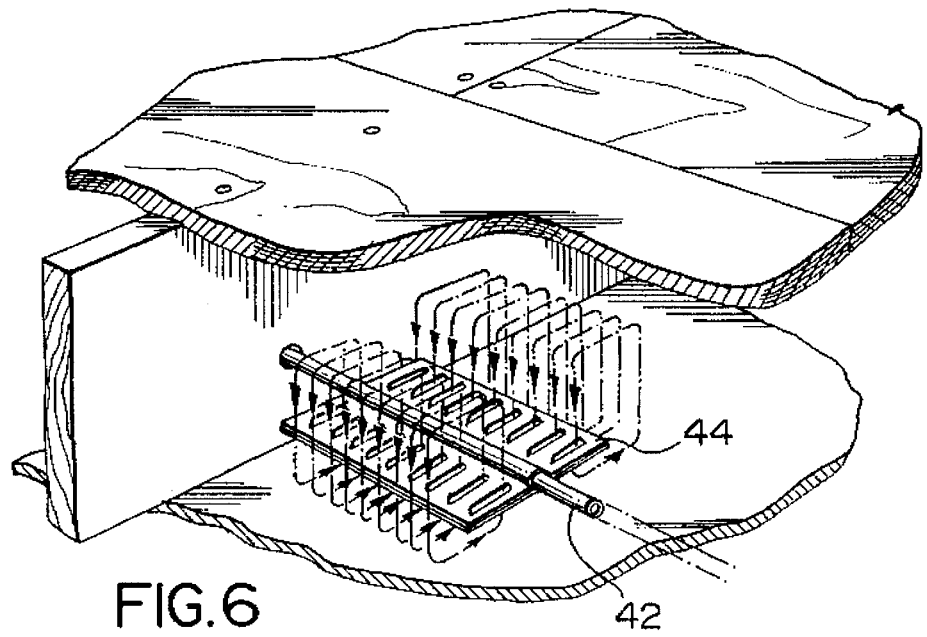
FIG. 6 is a perspective schematic view of the convection currents promoted by the heating fin shown in FIGS. 3 and 4.

FIG. 4 shows a perspective view of a portion of a hydronic heating system in accordance with the invention installed in a subfloor. A plurality of heat radiating fins 44 are attached to the tubing of the heating loop 42. Experimentation has shown that each heating fin in a typical installation will heat approximately 5 square feet (0.55 m$^2$) of floor area. In a typical floor installation where joists are spaced at 16" (40 cm), the heating tubes of heating loop 42 are typically spaced at about 30"–45" (75–112 cm) apart. Thus, the amount of tubing required in the heating loop 42 is reduced by about 60% or more. Most prior art installations required 500' (158 m) or more of heating tubing per room. In a loop of that length, it is necessary to install headers to ensure proper heat distribution. Typical headers include balancing values to ensure even heat distribution in the loops. These headers are expensive to purchase and add to installation overhead. A hydronic heating system in accordance with the invention minimizes loop length and therefore eliminates any requirement for loop headers.

As shown in FIG. 2, a heating system in accordance with the invention typically includes a distribution manifold 54 and a return manifold 56. The manifolds simply permit several heating loops 42 to be connected to a single boiler loop. Each heating loop 42 is commonly referred to as a "zone" and each zone is typically provided with a thermostat in the living/working space to be heated. A zone valve 58 typically controls the fluid flow through each heating loop 42. The zone valve is controlled by a thermostat (not illustrated). When the thermostat demands heat, the zone valve is opened and the opening of the valve actuates the pump 24 the boiler 28 which heats water that is returned from the heating loop 42 through the return manifold 56.

Heating fins 44 are preferably made from a thin sheet aluminum using a stamping process well known in the art. The fins are therefore inexpensively constructed, and since they readily clip together using a simple manual process, they are quickly and easily installed.

INDUSTRIAL APPLICABILITY

The hydronic heating system in accordance with the invention provides a novel heating system which reduces the cost of prior art systems and eliminates any requirement for expensive flow control equipment required for prior art hydronic heating systems. The present system also provides a more even heat distribution and increases boiler life by relieving stresses induced by prior art circulation controls.

A superior, simplified and efficient heating system which includes a novel heating radiating fin is therefore provided. The system is adapted for use in a wide range of industrial, commercial and residential heating systems to provide a radiant heat that is more comfortable and healthier than forced air heating.

The embodiments of the invention in which an exclusive property or privilege is claimed are defined as follows:

1. A hydronic heating system for connection with a boiler that supplies heated fluid for distribution through the system, comprising:

at least one endless loop of conduit for circulating the heated fluid, the conduit being suspended remote from a floor having parallel spaced-apart floor joists that support a flooring material so that the conduit does not directly contact any part of the floor; and a plurality of heat radiating fins affixable to the conduit for promoting a transfer of heat from the fluid in the conduit to air surrounding the conduit, the heat radiating fins having a conduit gripping part and a heat radiating part, the conduit gripping part being adapted to selectively engage the conduit in a close contact that promotes a transfer of heat from the conduit to the fin, and the heat radiating part being adapted to promote a transfer of heat from the fin to the air, whereby fluid heated by the boiler can be circulated directly through the conduit without special treatment to reduce the temperature of the fluid before circulation and the floor is evenly heated without hot spots by heat convected by the air surrounding the conduit.

2. A hydronic heating system as claimed in claim 1 wherein the conduit is arranged in a general direction that is transverse to the direction of the floor joists.

3. A hydronic heating system as claimed in claim 2 wherein the conduit is suspended beneath the floor by pulling the conduit through holes predrilled in the floor joists at predetermined spaced-apart intervals.

4. A hydronic heating system as claimed in claim 1 wherein the conduit gripping part is adapted to closely surround the conduit in a heat exchanging relationship with a wall of the conduit, and the heat radiating part extends away from the wall of the conduit for conducting heat from the conduit and exchanging the heat with air surrounding the heat radiating fin; and the conduit gripping part is selectively attachable to a point on the at least one endless loop of the hydronic heating conduit such that the heat radiating loop of the hydronic heating conduit such that the heat radiating fins may be attached to the conduit after the endless loop of the conduit has been installed in a floor structure; and the heat radiating fin is constructed from a material having a high coefficient of heat conduction.

5. A hydronic under floor heating system as claimed in claim 4 wherein the heat radiating fin comprises:

first and second substantially identical parts, each part having a conduit gripping portion that includes an elongated groove for engaging the conduit, and a plurality of tabs which mate with slots in the substantially identical second part, the first and second parts forming a tube which tightly surrounds a length of the conduit when the first and second parts are connected together using the tabs and the slots.

6. A hydronic heating system for heating a confined space having a floor supported by structural members, the heating system being adapted for connection with a boiler that supplies heated fluid for distribution through the system, comprising:

at least one endless loop of conduit for circulating the heated fluid, the conduit being suspended under the floor to be heated so that the conduit does not directly contact any part of an underside of the floor and an air space is provided between the conduit and the underside of the floor;

a plurality of heat radiating fins attached to the conduit for promoting a transfer of heat from the fluid circulated through the conduit to air surrounding the conduit in the air space, the heat radiating fins having a conduit gripping part and a heat radiating part, the conduit gripping part being adapted to securely engage the conduit in a close contact that promotes a transfer of heat from the conduit to the fin and the heat radiating part being louvered to promote a transfer of heat from the fin to the air in the air space;

whereby fluid heated by the boiler is circulated through the conduit without treatment to reduce the temperature of the fluid before circulation and the floor is evenly heated without hot spots substantially only by heat convected from the heat radiating fins by convection currents created in the air in the air space.

7. A hydronic heating system as claimed in claim 6 wherein the structural members supporting the floor comprises parallel spaced-apart floor joists.

8. A hydronic heating system as claimed in claim 7 wherein the conduit is arranged in a general direction that is transverse to the direction of the floor joists and the conduit is suspended beneath the floor by pulling the conduit through holes formed in the floor joists at predetermined spaced-apart intervals.

9. A hydronic heating system as claimed in claim 6 wherein the heat radiating fin comprises first and second substantially identical rectangular parts, each part having a conduit gripping portion that includes an elongated groove for engaging the conduit, and a plurality of tabs that mate with slots in the other part, the first and second parts in combination forming a tube which tightly surrounds a length of the conduit when the first and second parts are connected together using the respective tabs and the slots.

10. A hydronic heating system for heating a confined space having a floor with an underside and an air space beneath the underside of the floor, the heating system being adapted for connection with a boiler that supplies heated fluid for distribution through the system, comprising in combination:

at least one endless loop of conduit for circulating the heated fluid from the boiler, at least a portion of the endless loop being suspended under the floor, and that portion being arranged so that an air space is provided between the conduit and the floor;

a plurality of heat radiating fins attached to the conduit, each heat radiating fin being secured to the conduit in a heat conductive contact, and each heat radiating fin having a heat radiating part that is louvered to facilitate a circulation of air through the heat radiating fin to promote heat convection currents in the air space for transferring heat from the conduit to the floor;

whereby the floor is evenly heated by the convection currents and the fluid heated by the boiler is circulated through the conduit without treatment to reduce the temperature of the fluid before circulation.

11. A hydronic heating system for heating a confined space as claimed in claim 10 wherein the conduit is a pipe of the hybrid type that includes plastic and aluminum components to prevent the intrusion of atmospheric oxygen into the heated fluid.

12. A hydronic heating system for heating a confined space as claimed in claim 10 further including a distribution manifold positioned between the boiler and the endless loop and a return manifold positioned between the endless loop and the boiler.

13. A hydronic heating system for heating a confined space as claimed in claim 12 wherein the system further includes a zone valve and a thermostat to control fluid circulation through the endless loop, the thermostat being located in the confined space to monitor a temperature of the confined space, and the zone valve being positioned between the distribution manifold and the endless loop and responsive to signals from the thermostat to control fluid circulation through the endless loop.

* * * * *